(12) United States Patent
Fujiwara et al.

(10) Patent No.: US 11,293,560 B2
(45) Date of Patent: Apr. 5, 2022

(54) SOLENOID FLOW CONTROL VALVE

(71) Applicant: KAWASAKI JUKOGYO KABUSHIKI KAISHA, Kobe (JP)

(72) Inventors: Hiroaki Fujiwara, Kobe (JP); Noboru Ito, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 12 days.

(21) Appl. No.: 17/054,055

(22) PCT Filed: Apr. 23, 2019

(86) PCT No.: PCT/JP2019/017158
§ 371 (c)(1),
(2) Date: Nov. 9, 2020

(87) PCT Pub. No.: WO2019/216193
PCT Pub. Date: Nov. 14, 2019

(65) Prior Publication Data
US 2021/0215267 A1    Jul. 15, 2021

(30) Foreign Application Priority Data

May 7, 2018   (JP) .............................. JP2018-089388

(51) Int. Cl.
*F16K 31/42*    (2006.01)
*F15B 13/04*    (2006.01)
*F16K 31/06*    (2006.01)

(52) U.S. Cl.
CPC .......... *F16K 31/0655* (2013.01); *F16K 31/42* (2013.01); *F15B 13/0402* (2013.01);
(Continued)

(58) Field of Classification Search
CPC .............. F15B 13/0402; F15B 13/0435; F15B 2211/329; F15B 2211/30515;
(Continued)

(56) References Cited

U.S. PATENT DOCUMENTS 2,638,118 A * 5/1953 Chandler .............. B60T 11/105
137/598
4,982,803 A * 1/1991 Kervagoret .............. B62D 6/02
137/596.12
(Continued)

FOREIGN PATENT DOCUMENTS

JP          61270573 A   * 11/1986
JP        H08-001345 Y2     1/1996

*Primary Examiner* — Matthew W Jellett
(74) *Attorney, Agent, or Firm* — Oliff PLC

(57) ABSTRACT

A solenoid flow control valve includes: an inlet passage that allows an inlet port to communicate with a pilot pressure chamber; an outlet passage that allows the pilot pressure chamber to communicate with an outlet port; a fixed restrictor provided on the outlet passage; a pilot spool that closes the inlet passage when a solenoid is in a non-excitation state, whereas when solenoid is in an excitation state, opens inlet passage at an opening degree corresponding to an input current value to generate a pilot pressure corresponding to the input current value in pilot pressure chamber, the pilot spool opening a bypass passage when input current value is less and closes bypass passage when input current value is greater than or equal to the predetermined value; and a main spool that controls a flow rate from inlet to outlet port in accordance with the pilot pressure chamber's pilot pressure.

8 Claims, 7 Drawing Sheets

(52) U.S. Cl.
CPC .. *F15B 2211/329* (2013.01); *Y10T 137/87177* (2015.04); *Y10T 137/87185* (2015.04)

(58) Field of Classification Search
CPC ........ F15B 2211/3144; F15B 2211/327; F15B 2211/353; F15B 2211/355; F15B 2211/40507; F15B 2211/413; F15B 2211/41581; F15B 2211/426; F15B 2211/428; F15B 2211/46; F15B 2211/6355; F15B 2211/761; F15B 2211/853; F15B 2211/8633; F15B 11/044; F16K 31/0655; F16K 31/42; F16K 31/1221; Y10T 137/87177; Y10T 137/87185; Y10T 137/87193; Y10T 137/87201; Y10T 137/87217
See application file for complete search history.

(56) References Cited

U.S. PATENT DOCUMENTS

| | | | | |
|---|---|---|---|---|
| 5,445,188 A | * | 8/1995 | Bourkel | F15B 13/0402 137/625.63 |
| 2003/0188788 A1 | * | 10/2003 | Harms | F16H 61/0251 137/625.64 |

* cited by examiner

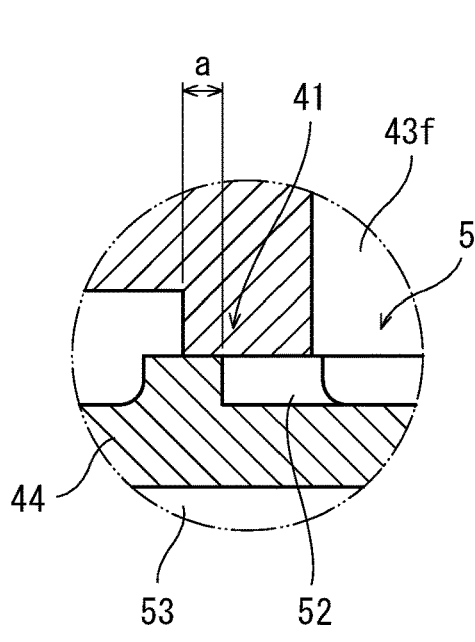
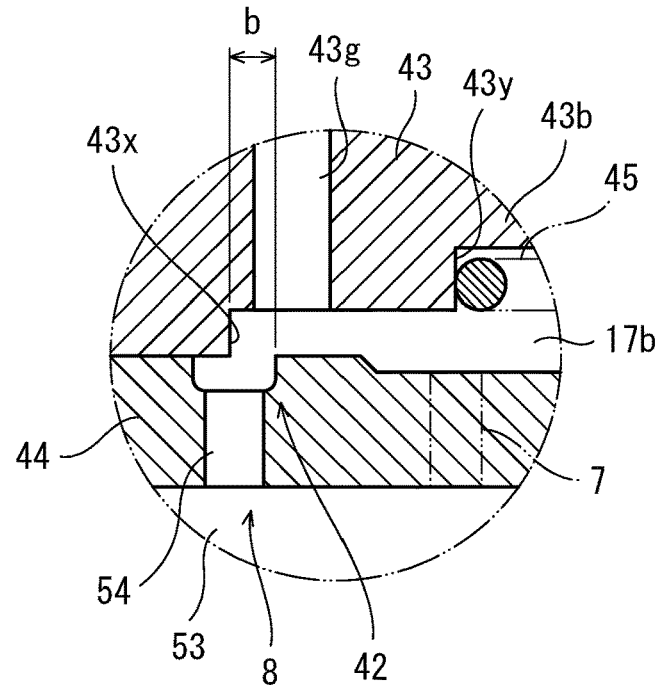
Fig.4A  Fig.4B
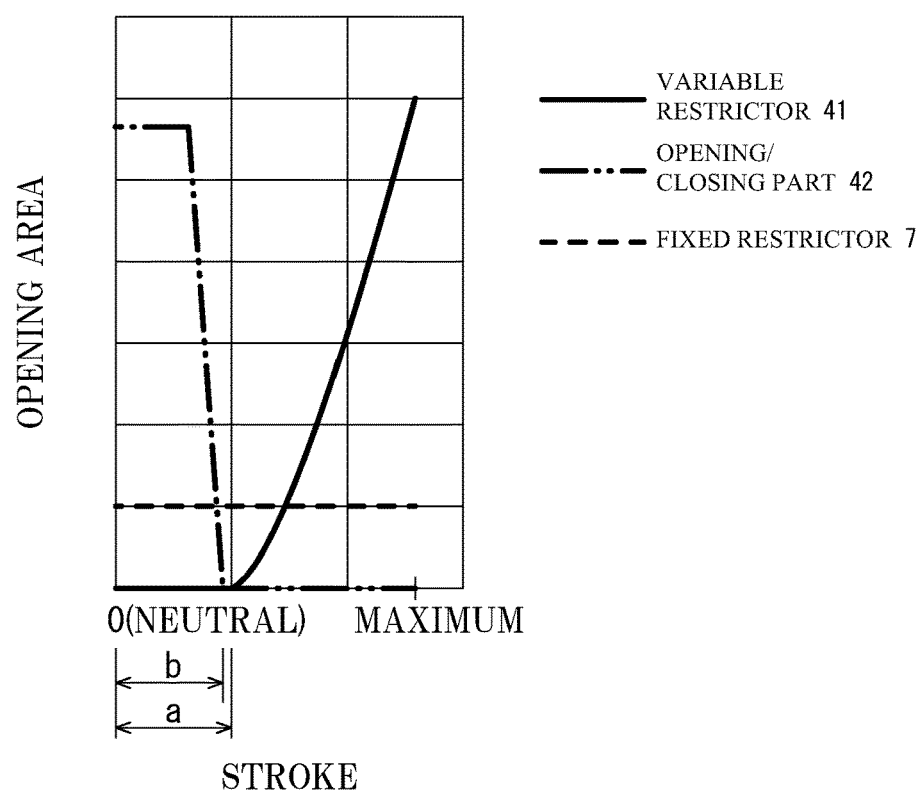
Fig.5

SOLENOID FLOW CONTROL VALVE

TECHNICAL FIELD

The present invention relates to a solenoid flow control valve.

BACKGROUND ART

FIGS. 8A and 8B show a conventional solenoid flow control valve 900 as disclosed in, for example, Patent Literature 1. The control valve 900 controls a flow rate from an inlet port 901 to an outlet port 902 in accordance with an input current value inputted to a proportional solenoid 903. For example, the control valve 900 constitutes a meter-out circuit. The inlet port 901 is connected to a hydraulic cylinder, and the outlet port 902 is connected to a tank.

The control valve 900 includes: an inlet passage 905, by which the inlet port 901 is connected to a pilot pressure chamber 904; an outlet passage 906, by which the pilot pressure chamber 904 is connected to the outlet port 902; and a fixed restrictor 907 interposed on the outlet passage 906. The control valve 900 further includes a pilot operation unit 908 and a flow control unit 909. The pilot operation unit 908 opens the inlet passage 905 by an opening degree corresponding to the input current value.

The pilot pressure chamber 904 is always connected to the outlet port 902 via the outlet passage 906. Due to the presence of the fixed restrictor 907, when the proportional solenoid 903 is in an excitation state, a pilot pressure corresponding to the input current value is generated in the pilot pressure chamber 904. The flow control unit 909 controls the flow rate from the inlet port 901 to the outlet port 902 in accordance with the pilot pressure in the pilot pressure chamber 904. The flow rate is roughly proportional to the input current value, i.e., roughly proportional to the pilot pressure. When the proportional solenoid 903 is in a non-excitation state, the pilot operation unit 908 closes the inlet passage 905, and thereby the internal pressure of the pilot pressure chamber 904 is equalized to the pressure at the outlet port 902. At the time, the flow control unit 909 blocks the inlet port 901 from the outlet port 902 to stop the flow of a hydraulic liquid from the inlet port 901 to the outlet port 902.

CITATION LIST

Patent Literature

PTL 1: Japanese Examined Utility Model Application Publication No. H08-1345

SUMMARY OF INVENTION

Technical Problem

When the proportional solenoid 903 is switched from the excitation state to the non-excitation state in order to stop the flow of the hydraulic liquid from the inlet port 901 to the outlet port 902, the hydraulic liquid in the pilot pressure chamber 904 passes through the fixed restrictor 907 and is discharged to the outlet port 902. Since the discharge flow rate is restricted by the fixed restrictor 907, it is difficult to quickly lower the internal pressure of the pilot pressure chamber 904 and to quickly stop the flow of the hydraulic liquid from the inlet port 901 to the outlet port 902.

In view of the above, an object of the present invention is to provide a solenoid flow control valve capable of quickly stopping the flow of the hydraulic liquid from the inlet port to the outlet port when switched from the excitation state to the non-excitation state.

Solution to Problem

A solenoid flow control valve according to one aspect of the present invention includes: a housing including an inlet port and an outlet port, the housing being provided with a pilot pressure chamber therein; an inlet passage that allows the inlet port to communicate with the pilot pressure chamber; an outlet passage that allows the pilot pressure chamber to communicate with the outlet port; a fixed restrictor provided on the outlet passage; a bypass passage that allows the pilot pressure chamber to communicate with the outlet port in a manner to bypass the fixed restrictor; a solenoid; a pilot spool that closes the inlet passage when the solenoid is in a non-excitation state, whereas when the solenoid is in an excitation state, opens the inlet passage at an opening degree corresponding to an input current value to generate a pilot pressure corresponding to the input current value in the pilot pressure chamber, the pilot spool opening the bypass passage when the input current value is less than a predetermined value and closing the bypass passage when the input current value is greater than or equal to the predetermined value; and a main spool that controls a flow rate from the inlet port to the outlet port in accordance with the pilot pressure in the pilot pressure chamber.

According to the above configuration, when the solenoid is switched from the excitation state to the non-excitation state in order to stop the flow of a hydraulic liquid from the inlet port to the outlet port, the bypass passage switches from a closed state to an open state due to a function of an opening/closing part. The fluid in the pilot pressure chamber is discharged to the outlet port by passing through not only the outlet passage, on which the fixed restrictor is interposed, but also the bypass passage. Since the hydraulic liquid also passes through the bypass passage, the discharge flow rate increases, and as a result, the internal pressure of the pilot pressure chamber decreases quickly, which makes it possible to quickly stop the flow of the hydraulic liquid from the inlet port to the outlet port.

The housing may include an outlet communication space that is formed at an outer surface side of the pilot spool and that communicates with the outlet port. The bypass passage may include a radial passage hole that is formed in the pilot spool and that communicates with the pilot pressure chamber, the radial passage hole being open in an outer circumferential surface of the pilot spool. The pilot spool may switch a state of the radial passage hole in accordance with a stroke amount of the pilot spool between a state where the radial passage hole communicates with the outlet communication space and a state where the radial passage hole is blocked from the outlet communication space.

According to the above configuration, since part of the bypass passage and the structure for opening/closing the bypass passage can be provided in the pilot spool, the solenoid flow control valve can be made compact.

The flow control unit may include a main spool that shifts a position thereof in an axial direction. Part of the outlet passage may include a spool internal passage that is formed in the main spool and that allows the pilot pressure chamber to communicate with the outlet port. The fixed restrictor may be provided at a non-end portion of the spool internal passage in the main spool.

According to the above configuration, it is not necessary to newly install an additional oil passage component. Therefore, the solenoid flow control valve can be made compact.

A load pressure generated in a hydraulic cylinder may be applied to the inlet port.

According to the above configuration, even when a pressure source is lost, the hydraulic cylinder can be quickly brought to a stop, so long as a load pressure is being exerted in the hydraulic cylinder.

Advantageous Effects of Invention

The present invention makes it possible to provide a solenoid flow control valve capable of quickly stopping the flow of the hydraulic liquid from the inlet port to the outlet port when switched from the excitation state to the non-excitation state.

BRIEF DESCRIPTION OF DRAWINGS

Each of FIGS. 4A and 4B is an enlarged view of part of FIG. 2 or FIG. 3; FIG. 4A shows a variable restrictor of the pilot operation unit; and FIG. 4B shows an opening/closing part of the pilot operation unit.

FIG. 5 is a diagram showing opening areas in the pilot operation unit.

DESCRIPTION OF EMBODIMENTS

Figure 1:
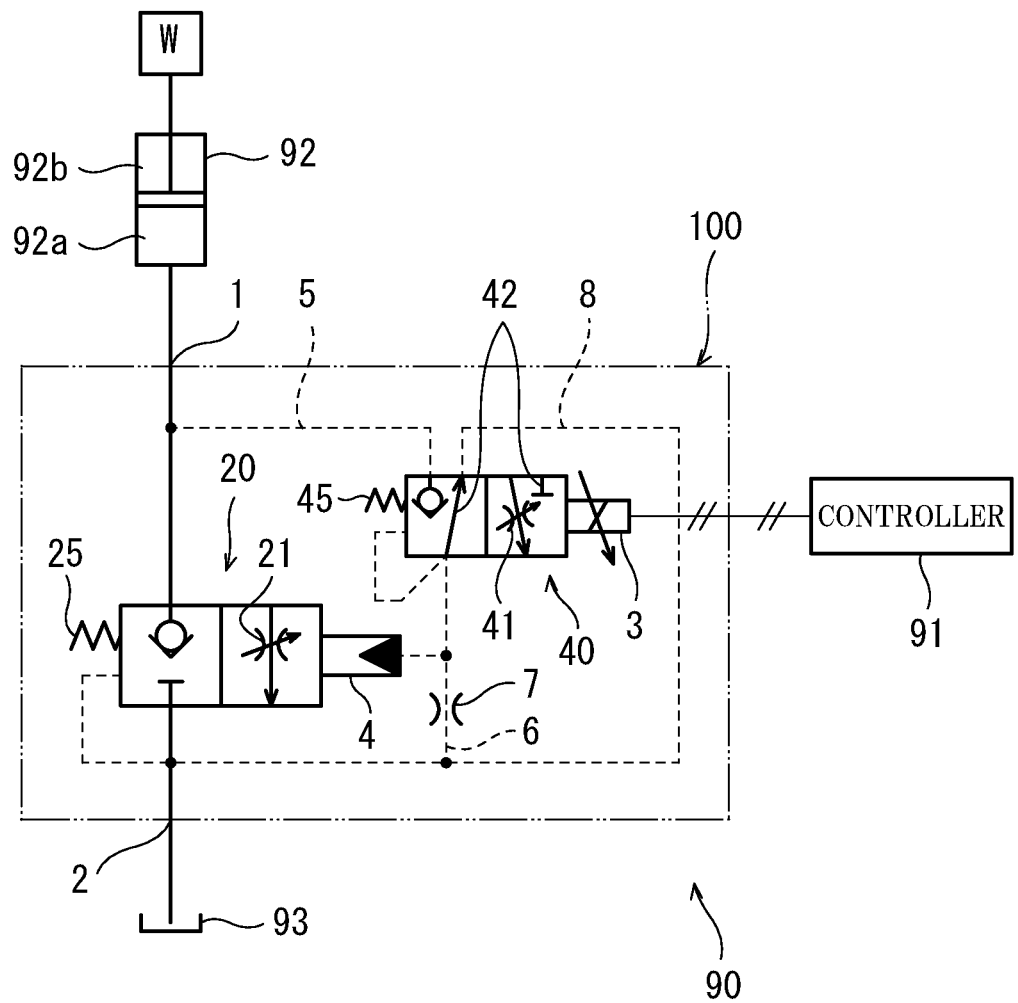
FIG. 1 is a circuit diagram showing a solenoid flow control valve according to Embodiment 1.

Hereinafter, embodiments are described with reference to the drawings. In the drawings, the same or corresponding elements are denoted by the same reference signs, and repeating the same detailed descriptions is avoided below.

Embodiment 1

<Circuit>

FIG. 1 is a circuit diagram showing a solenoid flow control valve (hereinafter, simply referred to as "control valve") 100 according to Embodiment 1. The control valve 100 includes an inlet port 1, an outlet port 2, and a solenoid 3. The control valve 100 controls a flow rate from the inlet port 1 to the outlet port 2 in accordance with an input current value inputted to the solenoid 3 (specifically, an electric current value of an electrical signal inputted to the solenoid 3). In the present embodiment, as a non-limiting example, the solenoid 3 is a proportional solenoid as represented by a circuit symbol.

As a non-limiting example, the control valve 100 is applied as a component of a meter-out circuit in a hydraulic drive system 90, which drives work equipment mounted to an agricultural machine or construction machine. The hydraulic drive system 90 includes: a controller 91, which outputs an electrical signal to the solenoid 3; a hydraulic cylinder 92, which drives the work equipment; and a tank 93, which stores hydraulic oil. The inlet port 1 is connected to a head oil chamber 92a of the hydraulic cylinder 92, and the outlet port 2 is connected to the tank 93. The head oil chamber 92a is positioned under a rod oil chamber 92b. A load pressure is generated in the head oil chamber 92a in accordance with a load on the hydraulic cylinder 92, such as the weight of the work equipment and an external force applied to the work equipment. The control valve 100 controls an outflow amount of the hydraulic oil returning to the tank 93 from the hydraulic cylinder 92, and consequently controls the retracting speed of the hydraulic cylinder 92 and the lowering speed of the work equipment. The control valve 100 is also capable of stopping the flow of the hydraulic oil from the hydraulic cylinder 92 to the tank 93, and keeping the stroke of the hydraulic cylinder 92 to any stroke in a situation where the load pressure is being generated in the head oil chamber 92a. Hereinafter, in light of this application example, the pressure at the inlet port 1 is sometimes referred to as "load pressure" and the pressure at the outlet port 2 is sometimes referred to as "tank pressure".

The control valve 100 includes a pilot pressure chamber 4, an inlet passage 5, an outlet passage 6, a fixed restrictor 7, a bypass passage 8, a flow control unit 20, and a pilot operation unit 40. The flow control unit 20 and the pilot operation unit 40 are each structurally realized by a spool valve. The flow control unit 20 includes a main spool 24, and the pilot operation unit 40 includes a pilot spool 44 (see FIG. 2). The term "stroke amount" herein means a shift amount of a spool from its neutral position. The inlet passage 5 allows the inlet port 1 to communicate with the pilot pressure chamber 4. The outlet passage 6 allows the pilot pressure chamber 4 to communicate with the outlet port 2. The fixed restrictor 7 is interposed on the outlet passage 6. The pilot pressure chamber 4 is always (regardless of the stroke amount of the pilot spool 44) in communication with the outlet port 2 via the outlet passage 6 equipped with the fixed restrictor 7. The bypass passage 8 allows the pilot pressure chamber 4 to communicate with the outlet port 2 in a manner to bypass the outlet passage 6. The inlet passage 5 and the bypass passage 8 are opened and closed by the pilot operation unit 40.

The pilot operation unit 40 is provided with a variable restrictor 41 and an opening/closing part 42. The variable restrictor 41 changes the opening degree of the inlet passage 5 in accordance with the input current value, i.e., in accordance with the stroke amount of the pilot spool 44. When the input current value is less than a first predetermined value (i.e., when the stroke amount is less than a first shift amount a), the variable restrictor 41 closes the inlet passage 5. On the other hand, when the input current value is greater than or equal to the first predetermined value (i.e., when the stroke amount is greater than or equal to the first shift amount a), the variable restrictor 41 reduces the pressure of the inlet passage 5 to control the pressure of the pilot pressure chamber 4 to a pressure roughly proportional to the input current value. When the input current value is greater than or equal to a second predetermined value (i.e., when the stroke amount is greater than or equal to a second shift amount b), the opening/closing part 42 closes the bypass passage 8. On the other hand, when the input current value is less than the second predetermined value (i.e., when the stroke amount is less than the second shift amount b), the opening/closing part 42 opens the bypass passage 8. The first predetermined value is set to be greater than or equal to the second predetermined value. The relationship between the first shift amount a and the second shift amount b is also set in the same manner (i.e., a≥b). Owing to these settings, when the variable restrictor 41 is open (i.e., while the pilot pressure is being controlled), the bypass passage 8 can be prevented from being opened.

It should be noted that, in the circuit diagram, it is illustrated that the upstream portion of the bypass passage 8 partially shares the same passage with the inlet passage 5 or the outlet passage 6. Such illustration is made for the purpose of showing, in a simplified manner, a feature that the pilot operation unit 40 is provided with the variable restrictor 41 and the opening/closing part 42 and a feature that the inlet passage 5 and the bypass passage 8 are not opened concurrently. Structurally, the bypass passage 8 is independent of the inlet passage 5. The upstream portion of the bypass passage 8 may be independent of the outlet passage 6 (Embodiments 1 and 3), or may partially share the same passage with the outlet passage 6 (Embodiment 2).

When the solenoid 3 is in a non-excitation state (i.e., when the input current value is zero), the pilot operation unit 40 is in a neutral state (see the left function in FIG. 1). The inlet passage 5 is closed, and the bypass passage 8 is opened by the opening/closing part 42. The pilot pressure chamber 4 communicates with the outlet port 2 via both the outlet passage 6 and the bypass passage 8. The internal pressure of the pilot pressure chamber 4 is equal to the tank pressure, and the flow control unit 20 is in a neutral state (see the left function in FIG. 1). At the time, the flow control unit 20 blocks the inlet port 1 from the outlet port 2, and consequently, the flow of the hydraulic oil from the inlet port 1 to the outlet port 2 is stopped. In the case of the aforementioned application example, the hydraulic cylinder 92 is stopped from moving, and the load on the hydraulic cylinder 92 is kept as it is.

When the solenoid 3 is in an excitation state (to be more specific, when the input current value is greater than the first predetermined value), the pilot operation unit 40 is brought into an acting state (see the right function in FIG. 1). The variable restrictor 41 opens the inlet passage 5 at an opening degree corresponding to the input current value. The hydraulic oil flows from the inlet port 1 to the pilot pressure chamber 4 via the inlet passage 5 equipped with the variable restrictor 41. The bypass passage 8 is closed by the opening/closing part 42, and the hydraulic oil flows from the pilot pressure chamber 4 to the outlet port 2 only via the outlet passage 6 equipped with the fixed restrictor 7. Due to the presence of the fixed restrictor 7, a pilot pressure roughly proportional to the input current value is generated in the pilot pressure chamber 4, and thereby the flow control unit 20 is brought into an acting state (see the right function in FIG. 1). In the flow control unit 20, the main spool 24 makes a stroke in accordance with the pilot pressure, thereby controlling the flow rate from the inlet port 1 to the outlet port 2. The main spool 24 is provided with a variable restrictor 21, which changes the opening degree between the inlet port 1 and the outlet port 2 in accordance with a stroke amount. The variable restrictor 21 is configured to increase the opening degree in accordance with increase in the pilot pressure. Owing to the above configuration, the flow rate from the inlet port 1 to the outlet port 2 is roughly proportional to the input current value, the opening degree of the variable restrictor 41, the pilot pressure, or the opening degree of the variable restrictor 21. In the case of the aforementioned application example, even while a load is being applied to the hydraulic cylinder 92, the retracting speed of the hydraulic cylinder 92, i.e., the lowering speed of the work equipment, can be controlled by the controller 91.

When the solenoid 3 is switched from the excitation state to the non-excitation state to hold the cylinder 92, the pilot pressure chamber 4 is connected to the outlet port 2 via not only the outlet passage 6 but also the bypass passage 8. In order to hold the cylinder 92, it is necessary to lower the internal pressure of the pilot pressure chamber 4 to close the variable restrictor 21, and the discharge flow rate thereof is determined by the diameter and the stroke amount of the main spool 24. When the solenoid 3 is brought into the non-excitation state, the discharge passage from the pilot pressure chamber 4 to the tank 93 becomes greater to an extent corresponding to an amount of hydraulic oil flowing through the bypass passage 8, which is open to a greater degree than the fixed restrictor 7. Consequently, the internal pressure of the pilot pressure chamber 4 can be quickly lowered to the tank pressure. After the input current value becomes zero, the flow control unit 20 can quickly return from the acting state to the neutral state, and the flow of the hydraulic oil from the inlet port 1 to the outlet port 2 can be stopped quickly. In the case of the aforementioned application example, the time from when the controller 91 outputs a stop command to the hydraulic cylinder 92 (i.e., from when the controller 91 stops outputting the electrical signal) to when the hydraulic cylinder 92 actually stops moving is reduced. That is, the stop responsiveness of the hydraulic cylinder 92 is improved.

In a case where the hydraulic drive system 90 is relatively large-sized, it is conceivable that the control valve 100 applied thereto is also required to be large-sized. In this case, the volume of the hydraulic oil to be discharged from the pilot pressure chamber 4 at the time of switching to the non-excitation state is great. According to the present embodiment, the discharge flow rate increases, which makes it possible to quickly discharge a large volume of hydraulic oil. Therefore, the present embodiment is particularly useful when applied to a large system.

<Structure>

Figure 2:
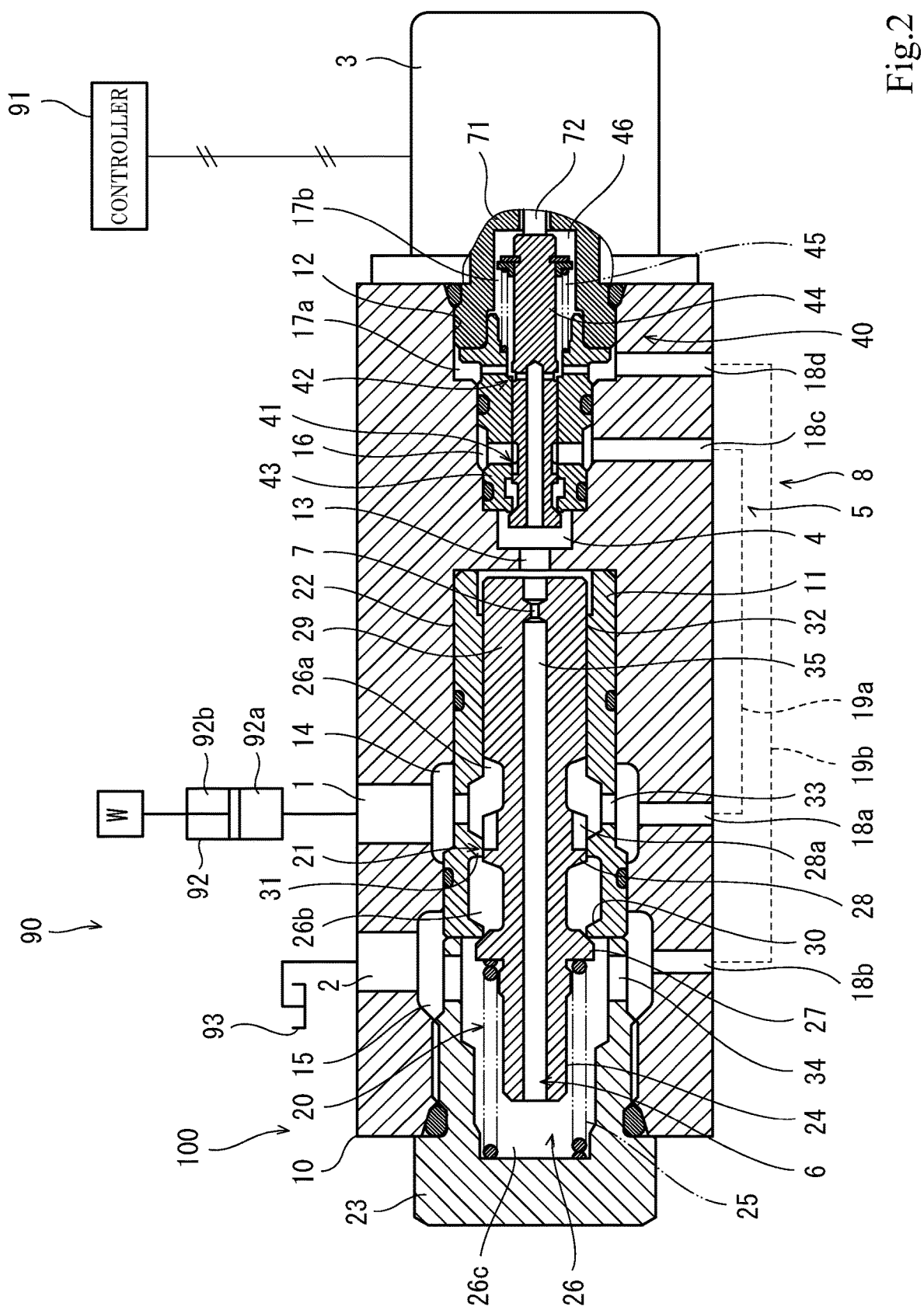
FIG. 2 is a sectional view of the solenoid flow control valve according to Embodiment 1.
Figure 3:
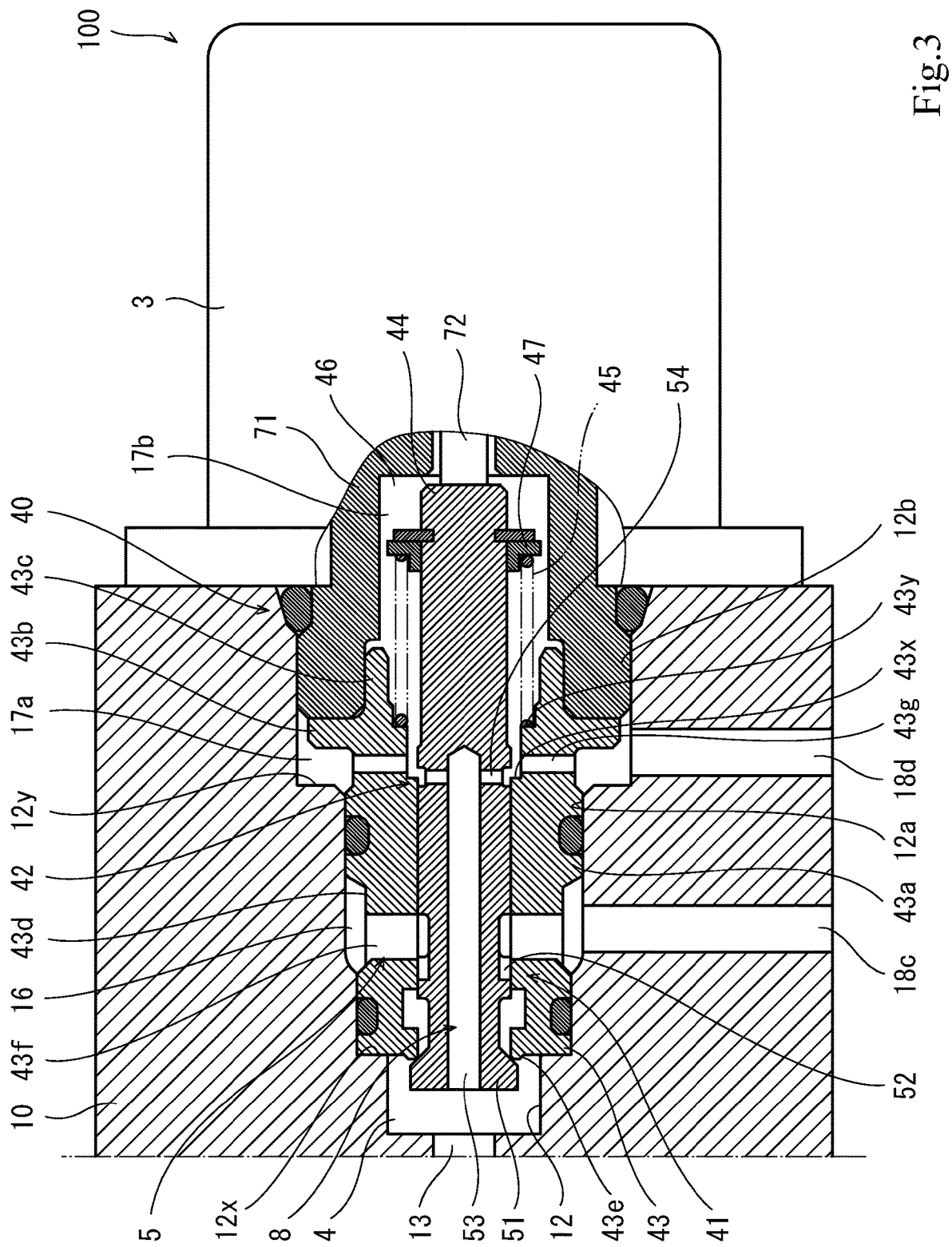
FIG. 3 is an enlarged view of part of FIG. 2, and shows a pilot operation unit.

FIG. 2 is a sectional view of the control valve 100 according to Embodiment 1. FIG. 3 is a sectional view of the pilot operation unit 40. Each of FIGS. 4A and 4B is an enlarged view of part of FIG. 2 or FIG. 3. FIG. 4A shows the variable restrictor 41, and FIG. 4B shows the opening/closing part 42. In these sectional views, the flow control unit 20 and the pilot operation unit 40 are in the neutral state. The right-left direction in the sectional views corresponds to the longitudinal direction or axial direction of a housing, the axial direction of bores, the axial direction or shifting direction of a spool and push rod, or the axial direction and extension/compression direction of a spring. In the sectional views, the left side corresponds to "one side" or "one end" in these directions, and the right side corresponds to "the other side" or "the other end" in these directions.

The control valve 100 includes a housing 10, in which a first bore 11 and a second bore 12 are formed. The first bore 11 is formed in the one end portion of the housing 10, and is open in the one end surface of the housing 10. The second bore 12 is formed in the other end portion of the housing 10, and is open in the other end surface of the housing 10. Each of the first bore 11 and the second bore 12 has a circular cross section, and the first bore 11 and the second bore 12 are arranged coaxially.

The flow control unit 20 is provided in the first bore 11, and the pilot operation unit 40 is provided in the second bore 12. The solenoid 3 is mounted to the other end surface of the housing 10, and the second bore 12 is sealed by the solenoid 3. In the middle portion of the housing 10, the center of the inner bottom of the bore 11 and the center of the inner bottom of the bore 12 are in communication with each other via a small-diameter passage hole 13. The second bore 12 has such a stepped shape that the internal diameter of the second bore 12 decreases toward the deeper side (i.e., toward the one side). The deeper-side portion (the one end portion) of the second bore 12 functions as the pilot pressure chamber 4. A pilot pressure generated in the pilot pressure chamber 4 is applied to the flow control unit 20 via the passage hole 13.

The housing 10 includes the inlet port 1 and the outlet port 2. Each of the ports 1 and 2 is open in the outer circumferential surface of the housing 10. The housing 10 further includes an inlet annular groove 14 and an outlet annular groove 15, which are formed in the inner circumferential surface of the first bore 11. With the pilot operation unit 40 incorporated in the second bore 12, an annular inlet communication space 16 and an annular first outlet communication space 17a are formed between the inner surface of the second bore 12 and the outer surface of the pilot operation unit 40. The inlet annular groove 14 is positioned to the other side of the outlet annular groove 15, and the inlet communication space 16 is positioned to the one side of the first outlet communication space 17a. The inlet port 1 is in communication with the inlet communication space 16 via the inlet annular groove 14, and the first outlet communication space 17a is in communication with the outlet port 2 via the outlet annular groove 15.

The housing 10 includes passage holes 18a, 18b, 18c, and 18d corresponding to the annular groove 14, the annular groove 15, the communication space 16, and the communication space 17a, respectively. Each of the passage holes 18a, 18b, 18c, and 18d is open in the outer surface of the housing 10. Outside the housing 10, the two passage holes 18a and 18c corresponding to the inlet annular groove 14 and the inlet communication space 16 are connected to each other by a piping member 19a, such as a hose. Similarly, outside the housing 10, the two passage holes 18b and 18d corresponding to the outlet annular groove 15 and the first outlet communication space 17a are connected to each other by a piping member 19b, such as a hose.

The inlet annular groove 14, the passage hole 18a, the piping member 19a, the passage hole 18c, and the inlet communication space 16 constitute part of the inlet passage 5. Part of the inlet passage 5, the part extending from the inlet communication space 16 to the pilot pressure chamber 4, is constituted by the pilot operation unit 40 provided with the variable restrictor 41.

In the present embodiment, the outlet passage 6 is constituted by the passage hole 13 and the flow control unit 20. The aforementioned first outlet communication space 17a, passage hole 18d, piping member 19b, passage hole 18b, and outlet annular groove 15 constitute part of the bypass passage 8. Part of the bypass passage 8, the part extending from the pilot pressure chamber 4 to the first outlet communication space 17a, is constituted by the pilot operation unit 40 provided with the opening/closing part 42.

The components constituting the flow control unit 20 include a sleeve 22, a plug 23, the main spool 24, and a spring 25. The sleeve 22 has a cylindrical shape, and both ends thereof are open. The plug 23 has a bottomed cylindrical shape. The sleeve 22 and the plug 23 are fitted in the first bore 11 in such a state that the sleeve 22 and the plug 23 are in close contact with each other in the axial direction. The first bore 11 is sealed by the plug 23. The main spool 24 and the spring 25 are accommodated in an internal space 26, which is formed in the first bore 11 by the sleeve 22 and the plug 23. The internal space 26 communicates with the pilot pressure chamber 4 via the passage hole 13.

The main spool 24 includes a poppet portion 27, a middle land portion 28, and a proximal end land portion 29, which are spaced apart from each other in the axial direction. The sleeve 22 includes: a seat portion 30 provided on the one end portion of the sleeve 22; a proximal end slidably contacting portion 32 provided on the other end portion of the sleeve 22; and a middle slidably contacting portion 31 provided between the seat portion 30 and the proximal end slidably contacting portion 32. The poppet portion 27 is positioned to the one side of the seat portion 30. The middle land portion 28 and the proximal end land portion 29 slidably contact the inner circumferential surface of the middle slidably contacting portion 31 and the inner circumferential surface of the proximal end slidably contacting portion 32, respectively. With the main spool 24 fitted in the internal space 26, the internal space 26 is divided up into: a first space 26a between the slidably contacting portions 31 and 32; a second space 26b between the seat portion 30 and the middle slidably contacting portion 31; and a plug space 26c formed by the plug 23. The sleeve 22 includes a through-hole 33 between the slidably contacting portions 31 and 32, and the inlet annular groove 14 is in communication with the first space 26a via the through-hole 33. The plug 23 also includes a through-hole 34, which is formed in the circumferential wall of the plug 23. The plug space 26c is in communication with the outlet annular groove 15 via the through-hole 34. The middle land portion 28 partitions off between the first space 26a and the second space 26b. A plurality of grooves 28a are formed in the outer circumferential surface of the middle land portion 28, such that the grooves 28a extend in the axial direction and are spaced apart from each other in the circumferential direction. The aforementioned variable restrictor 21 is constituted by the plurality of grooves 28a and the middle slidably contacting portion 31. The variable restrictor 21 changes the opening degree between the first space 26a and the second space 26b (i.e., the opening degree between the inlet port 1 and the outlet port 2).

The spring 25 urges the main spool 24 toward the other side. The spring 25 is a compression coil spring. The one end of the spring 25 is supported by the inner bottom surface of the plug 23, and the other end of the spring 25 is contacted by the main spool (e.g., the back surface of the poppet portion 27). The plug space 26c serves as a spring chamber that accommodates the spring 25. Meanwhile, a pilot pressure propagating from the pilot pressure chamber 4 to the internal space 26 via the passage hole 13 is applied to the other end surface of the main spool 24 toward the one side. It should be noted that, as shown in the circuit diagram of FIG. 1, the tank pressure is applied to the one end surface of the main spool 24 toward the other side.

In the present embodiment, the main spool 24 includes a spool internal passage 35, which is formed in the main spool 24 and communicates with the pilot pressure chamber 4 and the outlet port 2. As one example, the spool internal passage 35 is formed in a straight shape by an axial hole that is open in both end surfaces of the main spool 24 and that extends in the axial direction. The spool internal passage 35, the plug space 26c, and the through-hole 34 constitute part of the outlet passage 6. The fixed restrictor 7 is formed in the main spool 24, and is provided at a non-end portion of the spool internal passage 35. In this case, it is not necessary to newly install an additional oil passage component. Therefore, the control valve 100 can be made compact.

With reference to FIG. 3, the components constituting the pilot operation unit 40 include a sleeve 43, the pilot spool 44, and a spring 45. The sleeve 43 has a cylindrical shape overall, and both ends thereof are open.

The second bore 12 includes: a first stepped surface 12x formed on the one side (deeper side) of the second bore 12; and a second stepped surface 12y formed on the other side (shallower side) of the second bore 12. A portion of the second bore 12 positioned to the one side of the first stepped surface 12x forms the pilot pressure chamber 4. The second bore 12 further includes: a middle portion 12a between the first stepped surface 12x and the second stepped surface 12y; and a larger diameter portion 12b, which is positioned to the other side of the second stepped surface 12y.

The sleeve 43 includes: a base portion 43a fitted in the middle portion 12a; a flange portion 43b protruding in the radial direction from the other end portion of the base portion 43a; and a circumferential wall portion 43c protruding from the flange portion 43b toward the opposite side to the base portion 43a. The one end surface of the base portion 43a (the one end surface of the entire sleeve 43) is butted to the first stepped surface 12x, and the flange portion 43b is positioned inside the larger diameter portion 12b. A plug portion 71 of the solenoid 3 is attached to the opening of the second bore 12. The plug portion 71 has a cylindrical shape, and the one end thereof is open. The outer circumferential surface of the plug portion 71 is in close contact with the inner circumferential surface of the larger diameter portion 12b, and the one end surface of the plug portion 71 is in close contact with the other end surface of the flange portion 43b.

An annular groove 43d is formed in the outer circumferential surface of the base portion 43a. The annular groove 43d and the inner circumferential surface of the middle portion 12a form the inlet communication space 16. The one end surface of the flange portion 43b faces the second stepped surface 12y with a space formed therebetween. The one end surface of the flange portion 43b, the second stepped surface 12y, and the inner circumferential surface of the larger diameter portion 12b form the first outlet communication space 17a.

The pilot spool 44 and the spring 45 are accommodated in an internal space 46, which is formed in the second bore 12 by the sleeve 43 and the plug portion 71. The pilot spool 44 includes a poppet portion 51, which is provided on the one end portion of the pilot spool 44. The poppet portion 51 is positioned to the one side of a seat portion 43e, which is provided on the one end portion of the sleeve 43. The one end surface of the pilot spool 44 is positioned inside the pilot pressure chamber 4.

The other end portion of the pilot spool 44 is in contact with or closely faces a push rod 72 of the solenoid 3. The push rod 72 is configured to be advanceable and retractable in the axial direction in accordance with an input current value inputted to the solenoid 3. When the input current value is zero, the distal end of the push rod 72 is positioned deep inside the plug portion 71. When the input current value increases, the distal end of the push rod 72 advances toward the one side.

The inside of the other end side of the sleeve 43 is stepped, such that the internal diameter of the sleeve 43 is greater on the shallower side. Inside the sleeve 43, a first stepped surface 43x and a second stepped surface 43y are formed. At the one end side relative to the first stepped surface 43x, the internal diameter of the sleeve 43 is substantially the same as the external diameter of the pilot spool 44, and the pilot spool 44 slidably contacts the sleeve 43. At the other end side relative to the first stepped surface 43x, the internal diameter of the sleeve 43 is greater than the external diameter of the pilot spool 44. As a result, an annular second outlet communication space 17b is formed between the sleeve 43 and the pilot spool 44. The sleeve 43 includes passage holes 43g, which extend in the radial direction between the second stepped surface 12y and the one end surface of the flange portion 43b. The second outlet communication space 17b is in communication with the aforementioned first outlet communication space 17a via the passage holes 43g. The one end of the spring 45 is supported by the second stepped surface 43y, and the other end of the spring 45 is supported by a retainer 47, which is attached to the outer circumferential surface of the other end portion of the pilot spool 44. The spring 45 is a compression coil spring that is compressed in accordance with shifting of the pilot spool 44 toward the one side, thereby increasing its elastic force. The spring 45 urges the pilot spool 44 toward the other side.

When the solenoid 3 is in the non-excitation state, the pilot spool 44 is urged toward the other side by the urging force of the spring 45, and as shown in the drawing, the poppet portion 51 is seated on the seat portion 43e and stays stationary. That is, the pilot spool 44 is positioned in the neutral position, and the pilot operation unit 40 is in the neutral state.

With also reference to FIG. 4A, the sleeve 43 includes passage holes 43f, which are open in the inlet communication space 16 and extend in the radial direction. Meanwhile, a plurality of grooves 52 extending in the axial direction are formed in the outer circumferential surface of the pilot spool 44, such that the plurality of grooves 52 are spaced apart from each other in the circumferential direction. The variable restrictor 41 is constituted by the plurality of grooves 52 and the sleeve 43. When the pilot spool 44 is positioned in the neutral position, the one ends of the plurality of grooves 52 are sealed by the inner circumferential surface of the sleeve 43 although the other ends of the plurality of grooves 52 communicate with the passage holes 43f. When the pilot spool 44 shifts from the neutral position toward the one side by the first shift amount a, the poppet portion 51 becomes spaced apart from the seat portion 43e, and also, the passage holes 43f start communicating with the pilot pressure chamber 4 via the plurality of grooves 52. Consequently, the hydraulic oil is supplied from the inlet port 1 to the pilot pressure chamber 4. As shown in FIG. 5, when the pilot spool 44 shifts from the neutral position by an amount in excess of the first shift amount a, the opening degree of the variable restrictor 41 increases proportionally in accordance with the excess shift amount.

With also reference to FIG. 4B, the pilot spool 44 includes: an axial hole 53, which is open in the one end surface of the pilot spool 44 and extends in the axial direction inside the pilot spool 44; and radial passage holes 54, which are open in the outer circumferential surface of the pilot spool 44. The center side of each radial passage hole 54 is open to the axial hole 53, and communicates with the pilot pressure chamber 4 via the axial hole 53. It should be noted that the axial hole 53 is not a through-hole. In the present embodiment, the radial passage holes 54, the second outlet communication space 17b, the passage holes 43g, and the first outlet communication space 17a, together with the axial hole 53, constitute the bypass passage 8.

When the pilot spool 44 is positioned in the neutral position, the radial passage holes 54 are open to the second outlet communication space 17b. When the pilot spool 44 shifts from the neutral position toward the one side by the second shift amount b, the radial passage holes 54 are sealed by the inner circumferential surface of the sleeve 43, and the pilot pressure chamber 4 is blocked from the second outlet communication space 17b. The opening/closing part 42 is constituted by the sleeve 43 and the openings of the radial passage holes 54 formed in the pilot spool 44. The opening/closing part 42 switches between an open state and a closed state in accordance with a shift in the position of the pilot spool 44 relative to the sleeve 43.

Hereinafter, functions of the control valve 100 having the above-described structure are described although the description below contains some repetitive explanations. When the solenoid 3 is in the non-excitation state, the push rod 72 is retracted to the other side. The pilot spool 44 is urged to the other side by the urging force of the spring 45, and the poppet portion 51 is seated on the seat portion 43e and stays stationary. The variable restrictor 41 blocks the inlet communication space 16 from the pilot pressure chamber 4, and the inlet passage 5 is closed. The opening/closing part 42 is fully open, and the pilot pressure chamber 4 communicates with the outlet port 2 via the outlet passage 6 (the passage hole 13, the spool internal passage 35, the plug space 26c, the through-hole 34, the fixed restrictor 7, and the outlet annular groove 15) and the bypass passage 8 (the axial hole 53, the radial passage holes 54, the second outlet communication space 17b, the passage holes 43g, the first outlet communication space 17a, the passage hole 18d, the piping member 19b, and the passage hole 18b). The internal pressure of the pilot pressure chamber 4 is the tank pressure. Accordingly, the flow control unit 20 is in the neutral state. That is, the main spool 24 is urged to the other side by the urging force of the spring 25, and the poppet portion 27 is seated on the seat portion 30 and stays stationary. The variable restrictor 21 blocks the inlet port 1 from the outlet port 2, and the flow of the hydraulic oil from the inlet port 1 to the outlet port 2 is stopped.

In this neutral state, when the solenoid 3 starts to be excited, the push rod 72 is caused to advance toward the one side. When the pushing force of the push rod 72 becomes greater than the initial urging force of the spring 45, the pilot spool 44 is pushed toward the one side by the push rod 72 against the urging force. When the stroke amount of the pilot spool 44 reaches the second shift amount b, the opening/closing part 42 closes the bypass passage 8. Subsequently, when the stroke amount of the pilot spool 44 becomes greater than the first shift amount a, the variable restrictor 41 starts opening, and the opening degree of the variable restrictor 41 increases gradually. Since the second shift amount b is set to be less than or equal to the first shift amount a, the inlet passage 5 starts opening at the same time as or after the bypass passage 8 is closed.

When the variable restrictor 41 opens, the hydraulic oil in the inlet port 1 flows to the pilot pressure chamber 4 via the inlet passage 5 (the inlet annular groove 14, the passage hole 18a, the piping member 19a, the passage hole 18c, the inlet communication space 16, the passage holes 43f, and the variable restrictor 41). The hydraulic oil in the pilot pressure chamber 4 flows to the outlet port 2 via the outlet passage 6. Due to the flow rate restriction by the fixed restrictor 7 on the outlet passage 6, the pressure in the pilot pressure chamber 4 increases, and a pilot pressure is generated in the pilot pressure chamber 4. The pilot spool 44 is pressed toward the other end by the pilot pressure. The pilot spool 44 stops at a position where a resultant force of the urging force of the spring 45 and the pilot pressure is equivalent to the pushing force of the push rod 72.

The pilot pressure is applied to the other end surface of the main spool 24 via the passage hole 13. The main spool 24 is pressed toward the one side by the pilot pressure, and thereby shifts toward the one side against the urging force of the spring 25. The main spool 24 stops at a position where the pilot pressure (or a force resulting from the pressure difference between the pilot pressure and the tank pressure) is equivalent to the urging force of the spring 25. The variable restrictor 21 allows the inlet port 1 to communicate with the outlet port 2 at an opening degree corresponding to the stroke amount of the main spool 24.

When the solenoid 3 is switched from the excitation state to the non-excitation state, the push rod 72 retracts. The pilot spool 44 is brought back to the neutral position by the urging force of the spring 45. The variable restrictor 41 is closed, and the opening/closing part 42 is fully opened. The supply of the hydraulic oil from the inlet port 1 to the pilot pressure chamber 4 is cut off, and meanwhile, the pilot pressure chamber 4 communicates with the outlet port 2 via not only the outlet passage 6 but also the bypass passage 8. The hydraulic oil in the pilot pressure chamber 4 is discharged to the outlet port 2 also via the bypass passage 8, and the internal pressure of the pilot pressure chamber 4 decreases to the tank pressure relatively quickly. Accordingly, the main spool 24 is quickly brought back to the neutral position by the urging force of the spring 25, and the hydraulic oil stops flowing from the inlet port 1 to the outlet port 2.

The pilot spool 44 is configured to switch the state of the radial passage holes 54 in accordance with the stroke amount of the pilot spool 44 between a state where the radial passage holes 54 communicate with the second outlet communication space 17b and a state where the radial passage holes 54 are blocked from the second outlet communication space 17b. In this manner, the pilot spool 44 structurally realizes opening/closing of the bypass passage 8. Since part of the bypass passage 8 and the opening/closing part 42 are provided in the pilot spool 44, the control valve 100 can be made compact.

Embodiment 2

Figure 6:
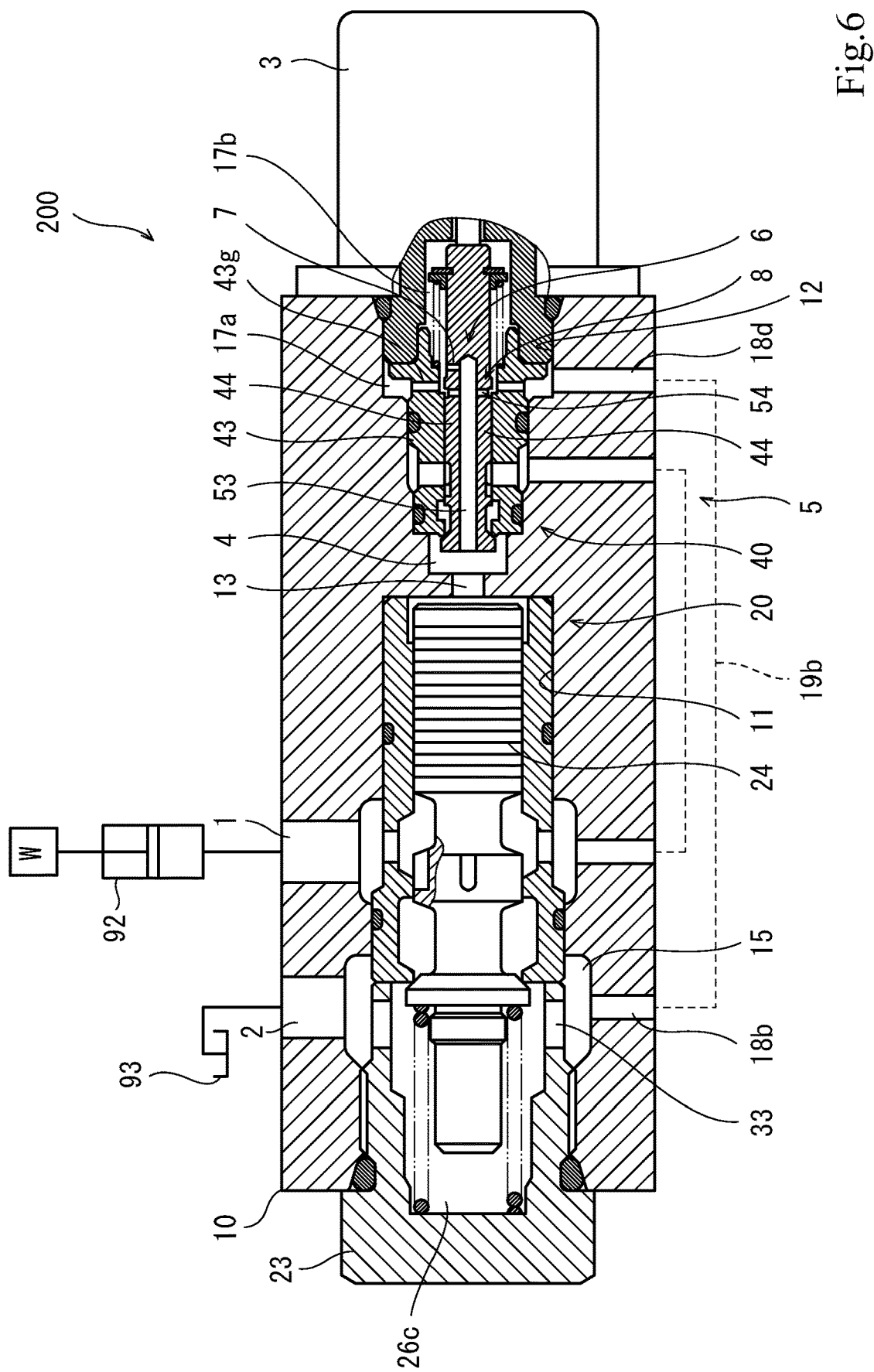
FIG. 6 is a sectional view of a solenoid flow control valve according to Embodiment 2.

FIG. 6 is a sectional view of a control valve 200 according to Embodiment 2. As shown in FIG. 6, the fixed restrictor 7 may be provided not in the main spool 24, but in the pilot spool 44. In this case, a small-diameter passage hole that allows the axial hole 53 to communicate with the second outlet communication space 17b is formed in the pilot spool 44, such that the small-diameter passage hole and the radial passage hole 54 of the opening/closing part 42 are arranged side by side in the axial direction. In this manner, the fixed restrictor 7 can be provided in the pilot spool 44.

In the present embodiment, the axial hole 53 and the second outlet communication space 17b constitute the outlet passage 6, and the axial hole 53 constitutes the bypass passage 8. This configuration can be represented by circuit symbols in the same manner as in FIG. 1, and provides the same functional advantages as those provided by Embodiment 1.

Embodiment 3

Figure 7:
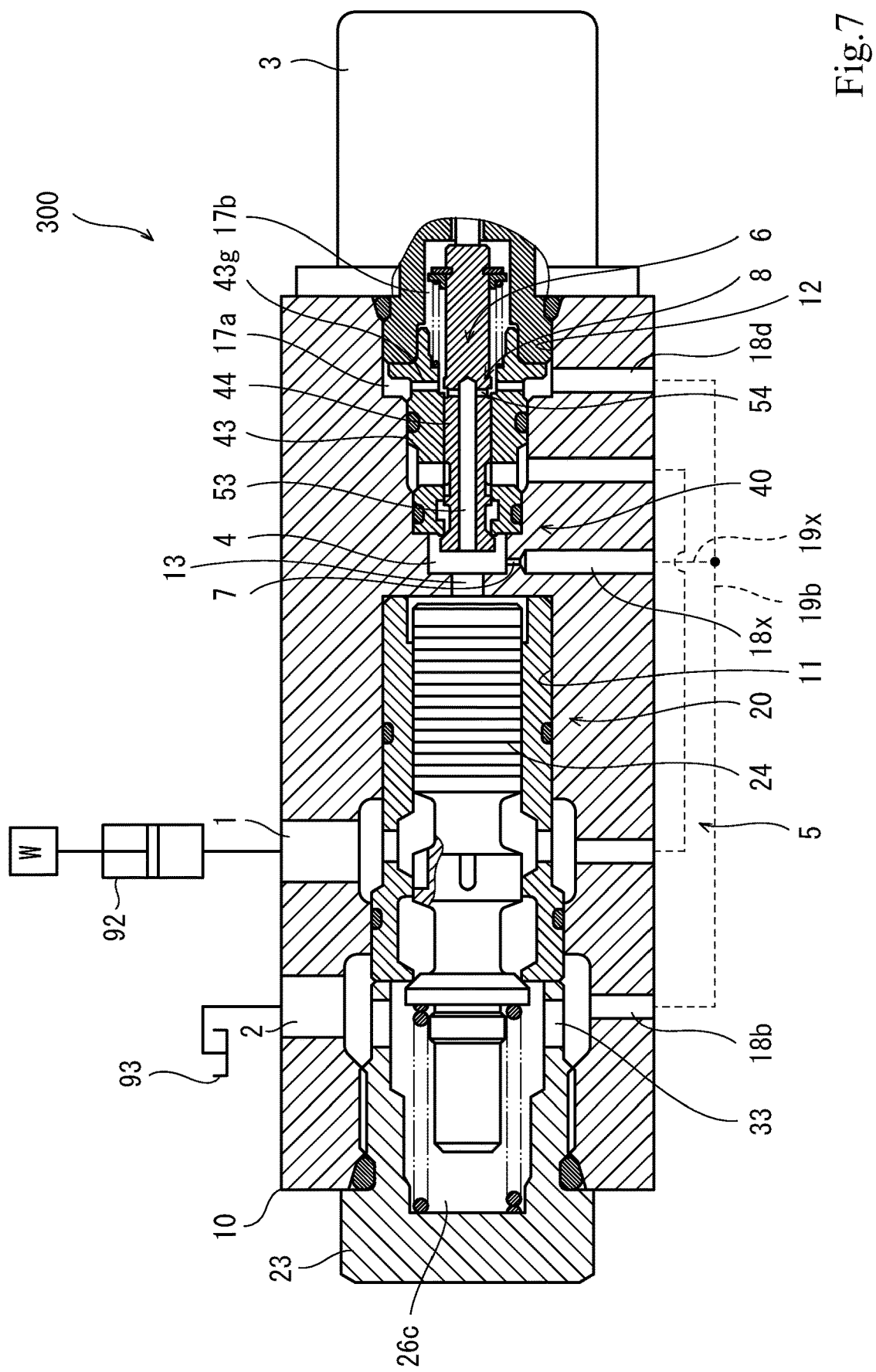
FIG. 7 is a sectional view of a solenoid flow control valve according to Embodiment 3.
Figure 8A:
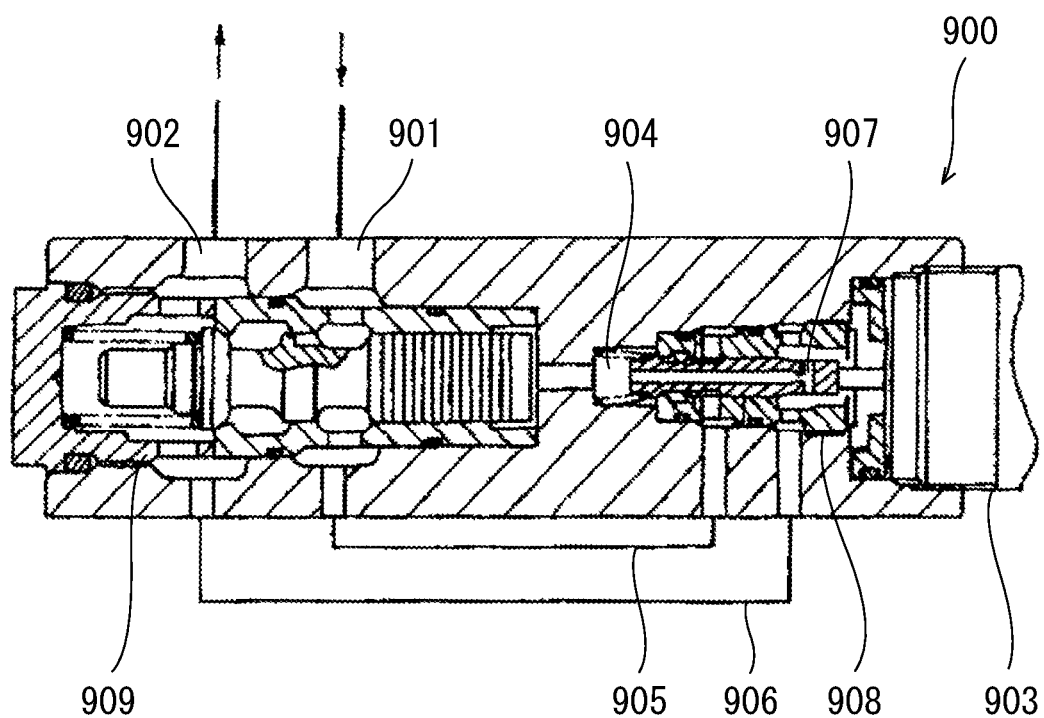
FIG. 8A is a sectional view of a conventional solenoid flow control valve.
Figure 8B:
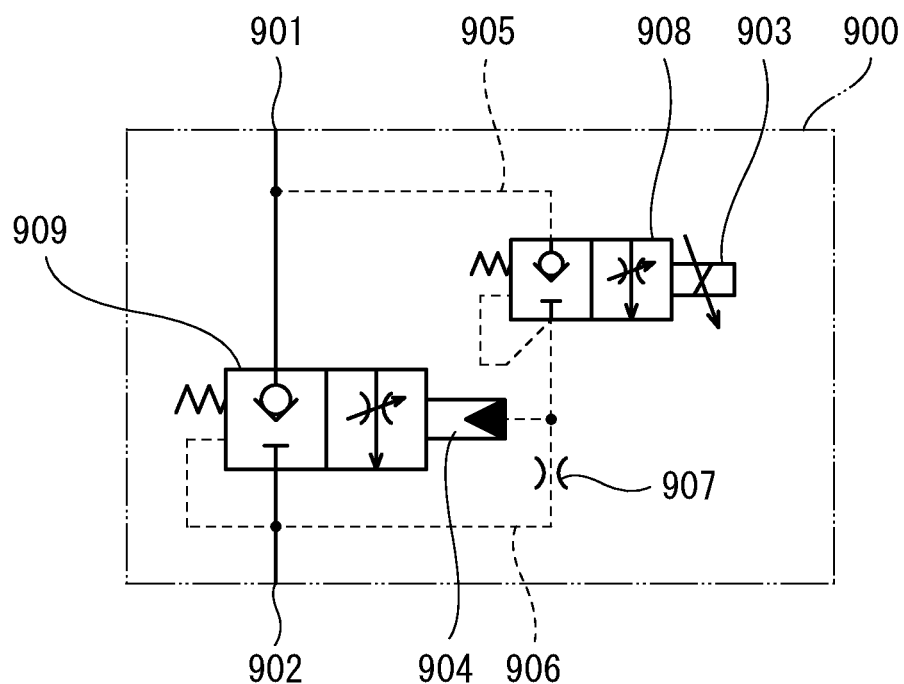
FIG. 8B is a circuit diagram showing the conventional solenoid flow control valve.

FIG. 7 is a sectional view of a control valve 300 according to Embodiment 3. As shown in FIG. 7, the fixed restrictor 7 may be provided not in the main spool 24 or the pilot spool 44, but in the housing 10. In this case, a passage hole 18x, which is open to the pilot pressure chamber 4, is formed in the housing 10. The passage hole 18x extends from the pilot pressure chamber 4 to the radially outer circumferential side of the second bore 12, and does not interfere with the passage hole 13 and the first bore 11. The passage hole 18x is open in the outer surface of the housing 10, and the opening of the passage hole 18x is connected to a piping member 19x. The piping member 19x is connected to the piping member 19b. The outlet passage 6 is branched off from the bypass passage 8 at the pilot pressure chamber 4, and merges with the bypass passage 8 at a connection point where the piping member 19x and the piping member 19b are connected. This configuration can be represented by circuit symbols in the same manner as in FIG. 1, and provides the same functional advantages as those provided by Embodiment 1.

Although the embodiments have been described as above, suitable modifications, additions, and/or deletions can be made to the above-described configurations within the scope of the present invention.

For example, in all of the above-described embodiments, the solenoid 3 is a proportional solenoid, and the pilot spool 44 is configured to: when the solenoid 3 is in the excitation state, generate a pilot pressure corresponding to the input current value in the pilot pressure chamber 4 at an opening degree corresponding to the input current value; open the bypass passage 8 when the input current value is less than the predetermined value (second predetermined value); and close the bypass passage 8 when the input current value is greater than or equal to the predetermined value (second predetermined value). This is a non-limiting example. The solenoid 3 may be an ON-OFF solenoid. In this case, the pilot spool is configured to close the inlet passage and open the bypass passage when the solenoid is in the non-excitation state, and open the inlet passage to generate a pilot pressure and close the bypass passage when the solenoid is in the excitation state. This configuration provides the same functional advantages as those provided by the above-described embodiments.

REFERENCE SIGNS LIST 100, 200, 300 solenoid flow control valve
1 inlet port
2 outlet port
3 solenoid
4 pilot pressure chamber
5 inlet passage
6 outlet passage
7 fixed restrictor
8 bypass passage
10 housing
17a, 17b outlet communication space
24 main spool
35 spool internal passage
44 pilot spool
54 radial passage hole

The invention claimed is:

1. A solenoid flow control valve comprising:
a housing including an inlet port and an outlet port, the housing being provided with a pilot pressure chamber therein;
an inlet passage that allows the inlet port to communicate with the pilot pressure chamber;
an outlet passage that allows the pilot pressure chamber to communicate with the outlet port;
a fixed restrictor provided on the outlet passage;
a bypass passage that allows the pilot pressure chamber to communicate with the outlet port in a manner to bypass the fixed restrictor;
a solenoid;
a pilot spool that closes the inlet passage and opens the bypass passage when the solenoid is in a non-excitation state, and opens the inlet passage, generates a pilot pressure in the pilot pressure chamber, and closes the bypass passage when the solenoid is in an excitation state; and
a main spool that controls a flow rate from the inlet port to the outlet port in accordance with the pilot pressure in the pilot pressure chamber.

2. The solenoid flow control valve according to claim 1, wherein
the housing includes an outlet communication space that is formed at an outer surface side of the pilot spool and that communicates with the outlet port,
the bypass passage includes a radial passage hole that is formed in the pilot spool and that communicates with the pilot pressure chamber, the radial passage hole being open in an outer circumferential surface of the pilot spool, and
the pilot spool switches a state of the radial passage hole in accordance with a stroke amount of the pilot spool between a state where the radial passage hole communicates with the outlet communication space and a state where the radial passage hole is blocked from the outlet communication space.

3. The solenoid flow control valve according to claim 1, wherein
part of the outlet passage includes a spool internal passage that is formed in the main spool and that allows the pilot pressure chamber to communicate with the outlet port, and
the fixed restrictor is provided at a non-end portion of the spool internal passage in the main spool.

4. The solenoid flow control valve according to claim 1, wherein
a load pressure generated in a hydraulic cylinder is applied to the inlet port.

5. The solenoid flow control valve according to claim 2, wherein
part of the outlet passage includes a spool internal passage that is formed in the main spool and that allows the pilot pressure chamber to communicate with the outlet port, and
the fixed restrictor is provided at a non-end portion of the spool internal passage in the main spool.

6. The solenoid flow control valve according to claim 2, wherein
a load pressure generated in a hydraulic cylinder is applied to the inlet port.

7. The solenoid flow control valve according to claim 3, wherein
a load pressure generated in a hydraulic cylinder is applied to the inlet port.

8. The solenoid flow control valve according to claim 5, wherein
a load pressure generated in a hydraulic cylinder is applied to the inlet port.

* * * * *